(12) United States Patent
Wang et al.

(10) Patent No.: US 8,570,287 B2
(45) Date of Patent: Oct. 29, 2013

(54) CAPACITIVE TOUCH PANEL HAVING COLOR COMPENSATION LAYER

(75) Inventors: Wen-Chun Wang, Taichung (TW);
Ping-Wen Huang, Taichung (TW);
Chih-Jung Teng, Taichung (TW);
Huang-Ming Chang, Chia Yi County (TW)

(73) Assignee: Wintek Corporation, Taichung (TW)

( * ) Notice: Subject to any disclaimer, the term of this patent is extended or adjusted under 35 U.S.C. 154(b) by 433 days.

(21) Appl. No.: 12/729,950

(22) Filed: Mar. 23, 2010

(65) Prior Publication Data

US 2010/0245285 A1 Sep. 30, 2010

(30) Foreign Application Priority Data

Mar. 24, 2009 (TW) .............................. 98109665 A

(51) Int. Cl.
*G06F 3/041* (2006.01)
(52) U.S. Cl.
USPC ..................................... 345/173; 178/18.01
(58) Field of Classification Search
USPC ....................................... 345/174; 178/18.06
See application file for complete search history.

(56) References Cited

U.S. PATENT DOCUMENTS

| | | | | |
|---|---|---|---|---|
| 8,199,127 | B2* | 6/2012 | Mamba et al. | 345/173 |
| 2001/0008717 | A1* | 7/2001 | Iijima | 428/702 |
| 2007/0242054 | A1* | 10/2007 | Chang et al. | 345/173 |
| 2008/0277259 | A1* | 11/2008 | Chang | 200/600 |
| 2008/0309633 | A1* | 12/2008 | Hotelling et al. | 345/173 |
| 2008/0309635 | A1* | 12/2008 | Matsuo | 345/173 |
| 2009/0002337 | A1* | 1/2009 | Chang | 345/174 |
| 2009/0085885 | A1* | 4/2009 | Wu et al. | 345/173 |
| 2009/0160824 | A1* | 6/2009 | Chih-Yung et al. | 345/175 |
| 2009/0213090 | A1* | 8/2009 | Mamba et al. | 345/174 |
| 2009/0231298 | A1* | 9/2009 | Yang | 345/173 |
| 2009/0236151 | A1* | 9/2009 | Yeh et al. | 178/18.03 |

\* cited by examiner

*Primary Examiner* — Adam J Snyder
(74) *Attorney, Agent, or Firm* — Muncy, Geissler, Olds & Lowe, PLLC

(57) ABSTRACT

A capacitive touch panel includes a transparent substrate, a plurality of first sensing electrode sets and second sensing electrode sets provided on the transparent substrate. Each first sensing electrode set includes a plurality of first sensing electrodes electrically coupled in series through a plurality of first wires. Each second sensing electrode set includes a plurality of second sensing electrodes. A color compensation layer having a mesh-like pattern is provided between the first sensing electrodes and the second sensing electrodes. The second wires cover part of the surface of the color compensation layer to couple the second sensing electrodes in series.

10 Claims, 7 Drawing Sheets

CAPACITIVE TOUCH PANEL HAVING COLOR COMPENSATION LAYER

BACKGROUND OF THE INVENTION (a) Field of the Invention

The invention relates to a touch panel, particularly to a capacitive touch panel capable of effectively decreasing the retained shadow between electrodes.

(b) Description of the Related Art

Generally, the shadow of the profile of each electrode, commonly referred to as "retained shadow" often exists in a conventional capacitive touch panel. The retained shadow is formed as a result of respective refractive indexes of different materials and different shapes of electrode patterns. The retained shadow may affect the visual effect. Especially, as the touch panel is provided on a display, the retained shadow results in noises on image signals and hence worsens the display quality.

BRIEF SUMMARY OF THE INVENTION

One object of the invention is to provide a capacitive touch panel capable of effectively decreasing the retained shadow between electrodes by providing a color compensation layer that optically matches with corresponding sensing electrodes to improve the visual effect.

According to an embodiment of the invention, a capacitive touch panel includes a transparent substrate, a plurality of transparent first sensing electrode sets aligned along a first direction, a plurality of transparent second sensing electrode sets aligned along a second direction, and an electrically insulated color compensation layer. The first direction and the second direction are, for example, orthogonal but are not limited to such configuration. The transparent substrate has a first surface and a second surface. The first sensing electrode sets and the second sensing electrode sets are provided on the first surface of the transparent substrate. The first sensing electrode sets are provided parallel to each other and each first sensing electrode set has a plurality of first sensing electrodes and a plurality of first wires. The adjacent first sensing electrodes in each first sensing electrode set are electrically coupled in series through the first wires. The second sensing electrode sets are provided parallel to each other and each second sensing electrode set has a plurality of second sensing electrodes and a plurality of second wires. The adjacent second sensing electrodes in each second sensing electrode set are electrically coupled in series through the second wires.

The electrically insulated color compensation layer is provided on the first surface of the transparent substrate and between the first sensing electrodes and the second sensing electrodes. The thickness of the color compensation layer is larger than the thickness of the first sensing electrodes, the thickness of the second sensing electrodes, and the thickness of first wires. The color compensation layer covers the first wires to have the second wires be electrically insulated from the first wires. Besides, a protection layer covers the first sensing electrodes, the second sensing electrode sets, and the color compensation layer. The color compensation layer can have a mesh-like pattern. Furthermore, the mesh-like pattern can be divided into a plurality of sub-patterns that are discontinuous.

In another embodiment of the invention, a capacitive touch panel is provided. Compared to the previous embodiment, the difference is that the color compensation layer is provided at a different location. Specifically, the color compensation layer is provided on the surfaces of the first sensing electrodes, the first wires, and the second sensing electrodes. Besides, an electrically insulated protection layer covers the first sensing electrodes, the second sensing electrode sets, and the color compensation layer.

In the above embodiments, the transparent substrate may be a plastic substrate, a glass substrate, or a color filter. The color compensation layer is made from an organic polymer material. The first sensing electrode and the second sensing electrode are made from a carbon nano tube, a conducting polymer, a silver filament, indium tin oxide (ITO), indium zinc oxide (IZO), zinc oxide (ZnO), or tin oxide (SnO). The second wires are made from a carbon nano tube, a conducting polymer, a silver filament, indium tin oxide, indium zinc oxide, zinc oxide, tin oxide, or a metallic material.

DETAILED DESCRIPTION OF THE INVENTION

Figure 1:
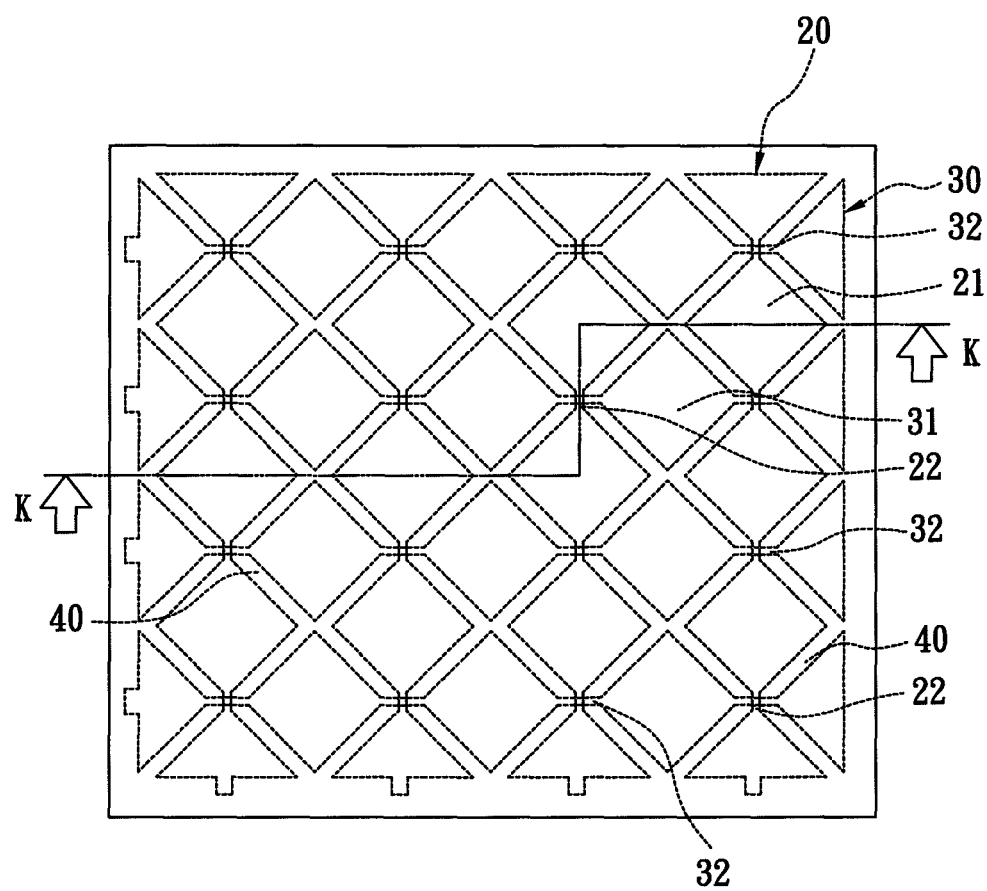
FIG. 1 shows a top view illustrating the first sensing electrode sets aligned along the vertical direction and the second sensing electrode sets aligned along the horizontal direction according to one embodiment of the invention.
Figure 2:
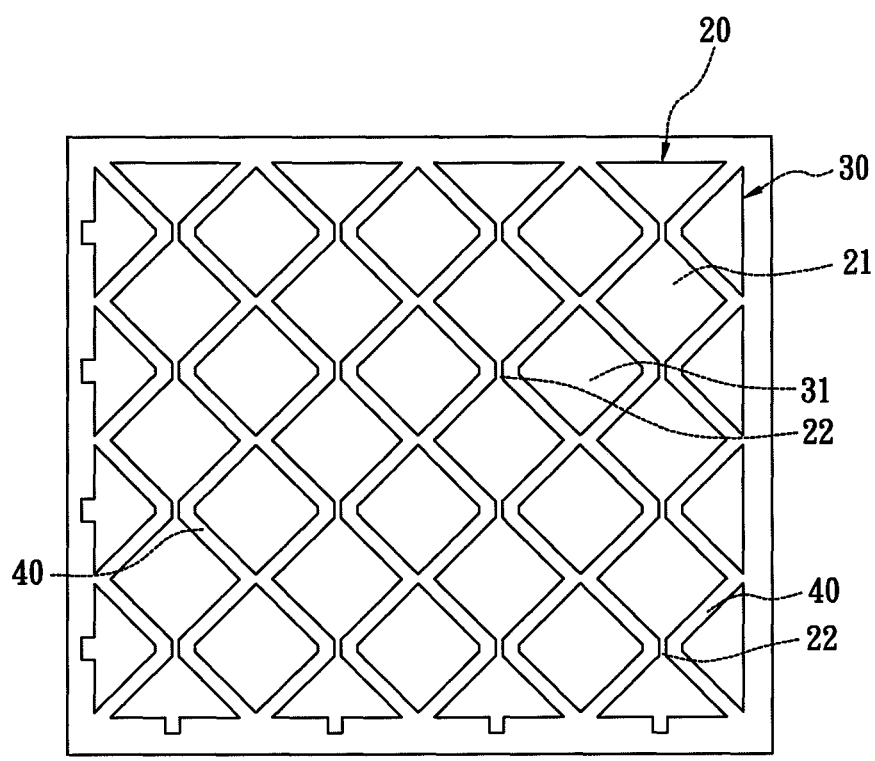
FIG. 2 shows a top view illustrating the structure and positions of the first sensing electrodes, the first wires, and the second sensing electrodes according to the first embodiment of the invention.
Figure 3:
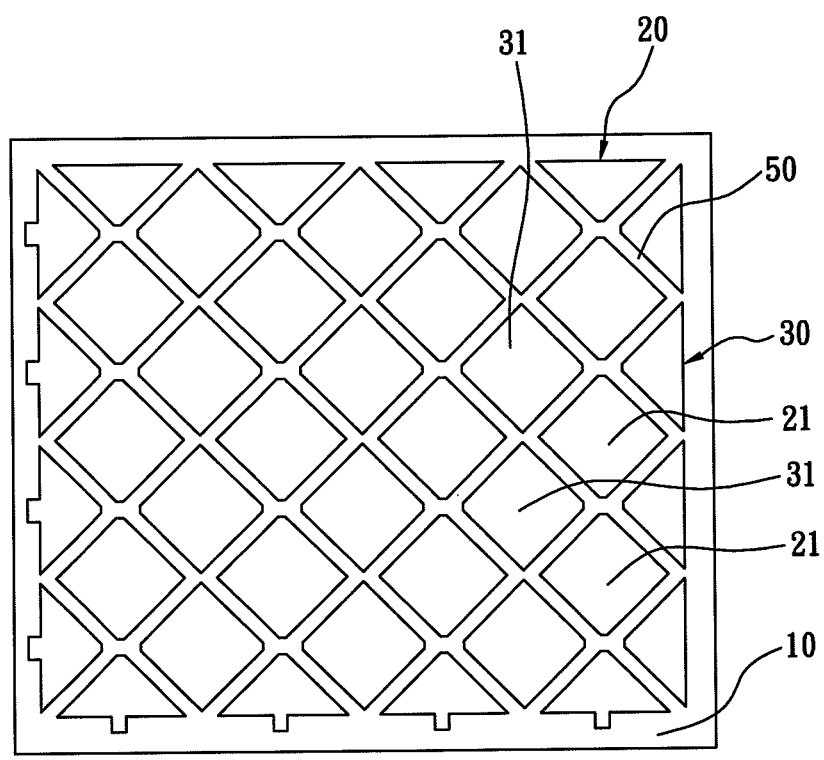
FIG. 3 shows a top view illustrating that the color compensation layer covers the first wires according to the first embodiment of the invention.
Figure 4:
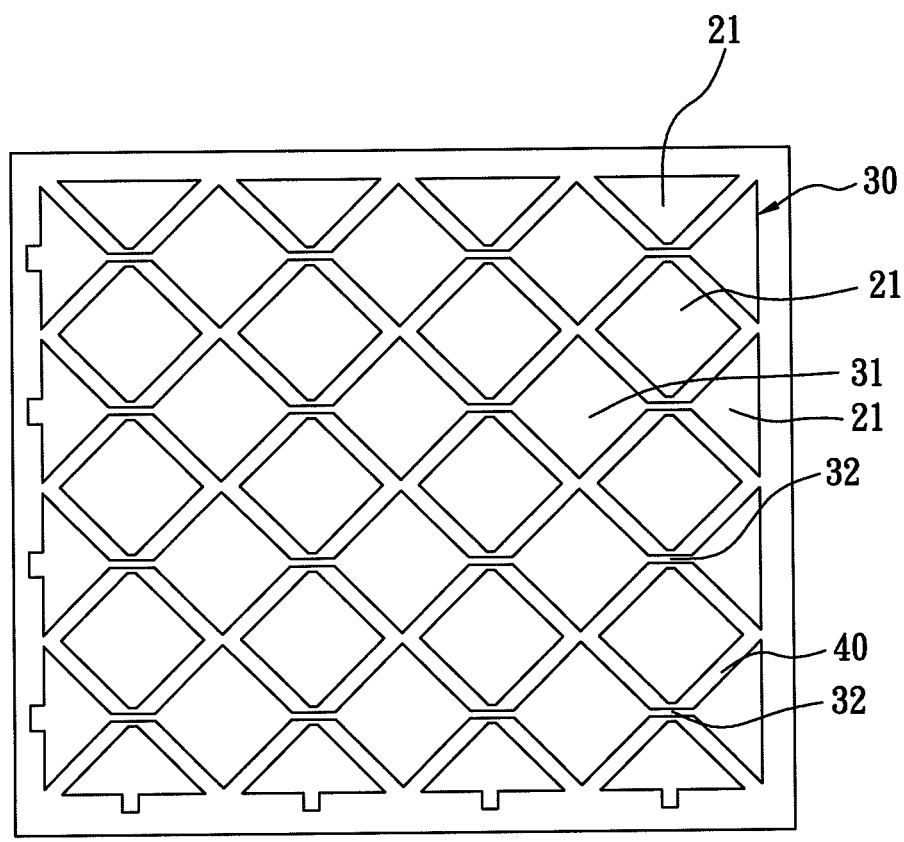
FIG. 4 shows a top views illustrating the second wires are provided and stacked on the surface of the color compensation layer according to the first embodiment of the invention.
Figure 5:
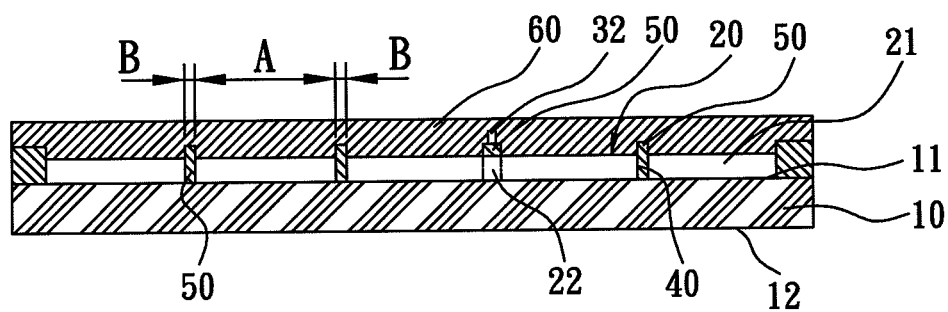
FIG. 5 shows a cross-section along the K-K line shown in FIG. 1 according to the first embodiment of the invention.

Referring to FIGS. 1 to 5, the schematic diagrams of the capacitive touch panel according to one embodiment of the invention are shown. FIG. 1 shows a top view of an embodiment of the invention, where the first sensing electrode sets 20 are provided along the vertical direction and the second sensing electrode sets 30 are provided along the horizontal direction. FIG. 2 shows a top view of an embodiment of the invention illustrating the structure and positions of the first sensing electrodes, the first wires, and the second sensing electrodes. FIG. 3 shows a top view of an embodiment of the invention illustrating that the color compensation layer covers the first wires. FIG. 4 shows a top view of an embodiment of the invention illustrating that the second wires are provided and stacked on the surface of the color compensation layer. FIG. 5 shows a cross-section along the K-K line shown in FIG. 1 according to an embodiment of the invention.

The capacitive touch panel according to an embodiment of the invention is described in detail below.

A transparent substrate 10 has a first surface 11 and a second surface 12, and the transparent substrate 10 may be a plastic substrate, a glass substrate, or a color filter. A plurality of transparent first sensing electrode sets 20 are provided on the first surface 11 of the transparent substrate 10. The first sensing electrode sets 20 are provided parallel to each other and are aligned along a first direction. Each first sensing electrode set 20 has a plurality of first sensing electrodes 21 and a plurality of first wires 22. The adjacent first sensing electrodes 21 are electrically coupled in series through the first wires 22.

A plurality of transparent second sensing electrode sets 30 are provided on the first surface 11 of the transparent substrate 10. The second sensing electrode sets 30 are provided parallel to each other and are aligned along a second direction. The first direction and the second direction are, for example, orthogonal to each other. For example, the first sensing electrode sets 20 are provided along a vertical direction and the second sensing electrode sets 30 are provided along a horizontal direction. Note it is only an example and the first direction and the second direction are not limited to be orthogonal to each other. Each second sensing electrode set 30 has a plurality of second sensing electrodes 31 and a plurality of second wires 32. The adjacent second sensing electrodes 31 are electrically coupled in series through the second wires 32. An insulation space 40 exist between the first sensing electrodes 21 and the second sensing electrodes 31 to have the first sensing electrodes 21 be electrically insulated from the second sensing electrodes 31.

An electrically insulated color compensation layer 50 is provided on the first surface 11 of the transparent substrate 10 to fill up the insulation space 40. Normally, the thickness of the color compensation layer 50 is larger than the thicknesses of the first sensing electrode 21, the second sensing electrode 31, and the first wires 22. The color compensation layer 50 covers the first wires 22; that is, the color compensation layer 50 between the first wires 22 and the second wires 32 to have the second wires 32 be electrically insulated from the first wires 22. The color compensation layer 50 fills up the insulation space 40 to form a mesh-like pattern. In one embodiment, the mesh-like pattern may be divided into a plurality of sub-patterns that are discontinuous.

A protection layer 60 is provided on the surfaces of the first sensing electrodes 21, the second sensing electrode sets 30, and the color compensation layer 50. In one embodiment, the protection layer 60 is made from an inorganic material, such as insulation material like silicon dioxide ($SiO_2$). The color compensation layer 50 may be made from an organic polymer material (OG). In this embodiment, a transparent material is chosen to increase light-transmittance. The first sensing electrodes 21, the first wires 22 and the second sensing electrodes 31 are made from a carbon nano tube, a conducting polymer, a silver filament, indium tin oxide (ITO), indium zinc oxide (IZO), zinc oxide (ZnO), or tin oxide (SnO). The second wires 32 are made from a carbon nano tube, a conducting polymer, a silver filament, indium tin oxide (ITO), indium zinc oxide (IZO), zinc oxide (ZnO), tin oxide (SnO), a metallic material, or the above materials doped with carbon nano tubes or silver.

According to the above embodiment, the color compensation layer 50 is provided between the first wires 22 and the second wires 32 to provide color compensation effect. In other words, the refractive index of the color compensation layer 50 matches the refractive indexes of the materials of the first sensing electrode sets 20 and the second sensing electrode sets 30 to decrease the visual difference between the first sensing electrode sets 20 and the second sensing electrode sets 30. As shown in FIG. 5, stacked structures in a sensing area A includes, from bottom to top, the transparent substrate 10, the first sensing electrode 21 or the second sensing electrode 31, and the protection layer 60. In comparison, stacked structures in an insulation area B includes, from bottom to top, the transparent substrate 10, the color compensation layer 50, and the protection layer 60. By matching the refractive indexes between different layers, the retained shadow of each electrode is decreased to thereby improve the visual effect.

The following tables I and II show simulation results about related optical characteristics. Here, the material of a protection layer is silicon dioxide ($SiO_2$) and the material of the color compensation layer is an organic polymer material (OG), such as a transparent organic polymer material. In the tables, the symbol "A" represents the sensing area, the symbol "B" represents the insulation area, the symbols "x" and "y" represent the x coordinate and y coordinate of a color chart, and "Luminosity" represents the value of luminosity. According to the (x,y) values shown in the tables I and II, different regions have similar visual effects of representing a blue color. For example, the x and y values of the sensing area A shown in the table I are less than 0.33 to represent a blue color, and the x and y values of the insulation area B shown in the table I are also less than 0.33 to represent a blue color. Thus, the sensing area A and the insulation area B have similar visual effects of representing a blue color. Therefore, the color difference between the sensing area A and the insulation area B is reduced. Table II also illustrates similar results as compared with Table I.

TABLE I

| $SiO_2$ = 200 nm, ITO = 10 nm, OG = 1000 nm | | Index of OG n = 1.45 |
|---|---|---|
| A | x | 0.303 |
|  | y | 0.329 |
|  | Luminosity | 5.36 |
| B | x | 0.323 |
|  | y | 0.317 |
|  | Luminosity | 3.49 |

TABLE II

| $SiO_2$ = 200 nm, ITO = 15 nm, OG = 1000 nm | | Index of OG n = 1.45 |
|---|---|---|
| A | x | 0.294 |
|  | y | 0.329 |
|  | Luminosity | 6.22 |
| B | x | 0.323 |
|  | y | 0.317 |
|  | Luminosity | 3.49 |

Figure 6:
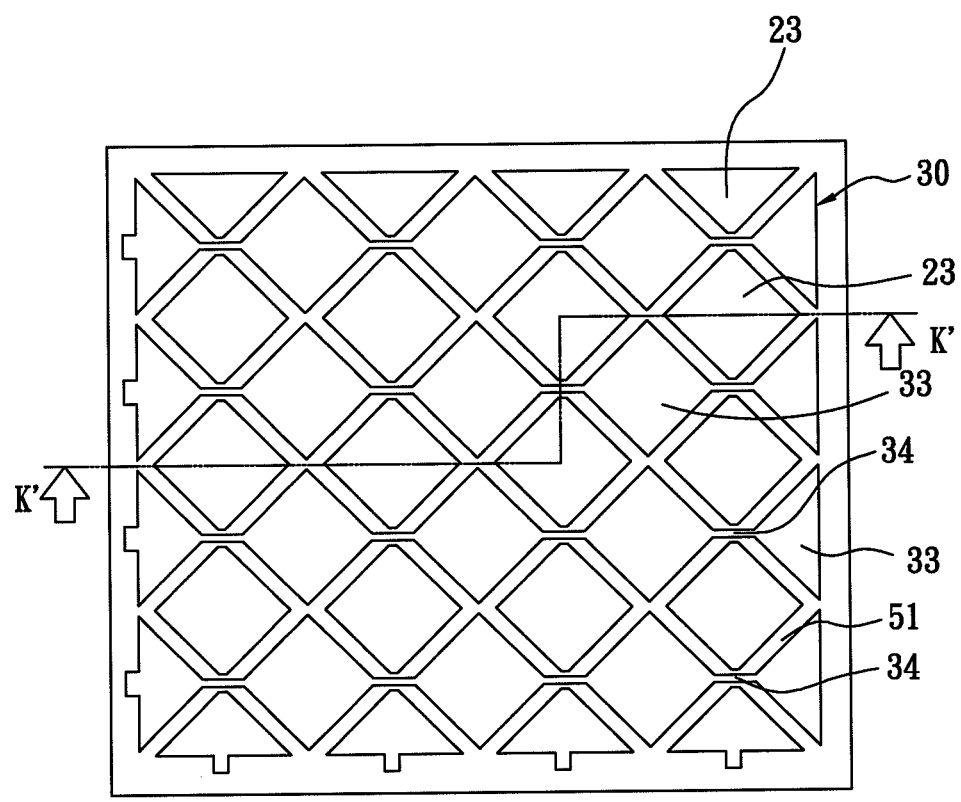
FIG. 6 shows a top view illustrating the second embodiment of the invention.
Figure 7:
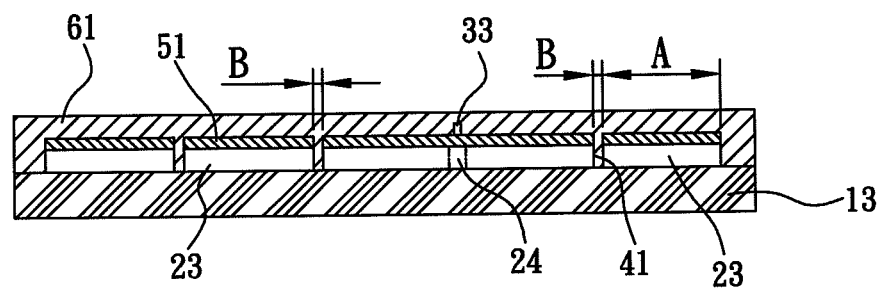
FIG. 7 shows a cross-section along the K'-K' line shown in FIG. 6 illustrating that the second wires are provided on the color compensation layer according to the second embodiment of the invention.

Referring to FIG. 6 and FIG. 7, according to another embodiment of the invention, the capacitive touch panel also includes the transparent substrate, the first sensing electrode sets, and the second sensing electrode sets. The stacked structures are similar to that of the previous embodiment shown in FIG. 1, thus not explaining in detail. Note that the first wires indeed exist but are not shown FIG. 6. The first wires are not depicted for the purpose of more clearly showing that the second wires are on the top of the first wires. FIG. 7 shows a cross-section cut along the K'-K' line shown in FIG. 6. Compared with the previous embodiment, in this embodiment the surfaces of the first sensing electrode 23, the second sensing electrode (not shown), and the first wires 24 are all provided with the color compensation layer 51. In addition, the insulation space 41 between sensing electrodes is filled with a protection layer 61 instead of the color compensation layer 51. Each second wire 34 of the second electrode set is provided and stacked on the surface of the color compensation layer 51 and connected to the adjacent second sensing electrodes 33, as shown in FIG. 6. Finally, the surfaces of the color compensation layer 51, the second wires 34, and the insulation space 41 are covered with the protection layer 61. In FIG. 6, stacked structures in a sensing area A includes, from bottom to top, the transparent substrate 13, the first sensing electrode 23 or the second sensing electrode, the color compensation layer 51, and the protection layer 61. In comparison, stacked structures in a corresponding insulation area B includes, from bottom to top, the transparent substrate 13 and the protection layer 61. By using the color compensation layer 51 to match the refractive indexes, the visual difference between the sensing area A and the insulation area B is decreased to thereby effectively increase visual effect.

This embodiment is similar to the previous embodiment since they both have a color compensation layer to cover the first wires and the second wires penetrate part of the surface of the color compensation layer to electrically connect adjacent second sensing electrodes in series. In comparison, the difference lies in that the color compensation layer in the previous embodiment is only provided between the first sensing electrode and the second sensing electrode, and that the color compensation layer in this embodiment is correspondingly provided on the surfaces of the first sensing electrode and the second sensing electrode.

The following tables III to V show simulation results about related optical characteristics according to the second embodiment. Here, the material of a protection layer is silicon dioxide ($SiO_2$) and the material of the color compensation layer is an organic polymer material (OG). The materials of the first electrode and the second electrode are ITO. In the tables, the symbol "A" represents the sensing area, the symbol "B" represents the insulation area, the symbols "x" and "y" represent the x coordinate and y coordinate of a color chart, and "Luminosity" represents the value of luminosity. According to the (x, y) values shown in the tables III to V, different regions have similar visual effects of representing a yellow color. For example, the x and y values of the sensing area A shown in the table III are more than 0.33 to represent a yellow color, and the x and y values of the insulation area B shown in the table III are also more than 0.33 to represent a yellow color. Thus, the sensing area A and the insulation area B have similar visual effects of representing a yellow color. Therefore, the color difference between the sensing area A and the insulation area B is reduced. Table IV and V also illustrate similar results as compared with Table III.

TABLE III

| $SiO_2$ = 200 nm, | | Index of OG | |
|---|---|---|---|
| ITO = 10 nm, OG = 1000 nm | | n = 1.55 | n = 1.6 |
| A | x | 0.351 | 0.364 |
|   | y | 0.352 | 0.371 |
|   | Luminosity | 4.58 | 5.2 |
| B | x | 0.346 | 0.346 |
|   | y | 0.351 | 0.351 |
|   | Luminosity | 4.17 | 4.17 |

TABLE IV

| $SiO_2$ = 200 nm, ITO = 15 nm, | | Index of OG | |
|---|---|---|---|
| OG = 1000 nm | | n = 1.55 | n = 1.6 |
| A | x | 0.345 | 0.357 |
|   | y | 0.339 | 0.359 |
|   | Luminosity | 4.87 | 5.46 |

TABLE IV-continued

| $SiO_2$ = 200 nm, ITO = 15 nm, | | Index of OG | |
|---|---|---|---|
| OG = 1000 nm | | n = 1.55 | n = 1.6 |
| B | x | 0.346 | 0.346 |
|   | y | 0.351 | 0.351 |
|   | Luminosity | 4.17 | 4.17 |

TABLE V

| $SiO_2$ = 200 nm, ITO = 20 nm, OG = 1000 nm | | Index of OG n = 1.6 |
|---|---|---|
| A | x | 0.349 |
|   | y | 0.351 |
|   | Luminosity | 5.69 |
| B | x | 0.346 |
|   | y | 0.351 |
|   | Luminosity | 4.17 |

Figure 8:
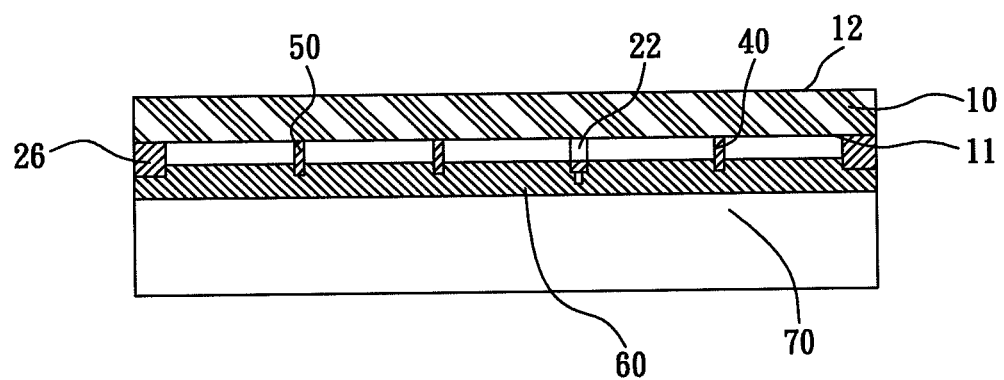
FIG. 8 shows a display apparatus having a flat display and a capacitive touch panel disposed thereon.

Referring to FIG. 8, the capacitive touch panel is disposed on a flat display 70 to function as an interface of an object such as a finger or a stylus. The display 70 may be a liquid crystal display, an organic light emitting diode display, an electrophoretic display, or an electro-wetting display. The transparent substrate 10 may serve as a cover lens, and the light shielding layer 26 is located on the peripheral of the cover lens. The material of the cover lens 10 may be plastic or glass.

Although the present invention has been fully described by the above embodiments, the embodiments should not constitute the limitation of the scope of the invention. Various modifications or changes can be made by those who are skilled in the art without deviating from the spirit of the invention.

What is claimed is:
1. A capacitive touch panel, comprising:
a transparent substrate having a first surface and a second surface;
a plurality of transparent first sensing electrode sets provided on the first surface of the transparent substrate and aligned along a first direction, wherein the first sensing electrode sets are provided parallel to each other, each first sensing electrode set has a plurality of first sensing electrodes and a plurality of first wires, and the adjacent first sensing electrodes in each first sensing electrode set are electrically coupled in series through the first wires;
a plurality of transparent second sensing electrode sets provided on the first surface of the transparent substrate and aligned along a second direction, wherein the second sensing electrode sets are provided parallel to each other, each second sensing electrode set has a plurality of second sensing electrodes and a plurality of second wires, and the adjacent second sensing electrodes in each second sensing electrode set are electrically coupled in series through the second wires; and
an electrically insulated color compensation layer provided on the first surface of the transparent substrate, wherein the color compensation layer is disposed in a space existing between the first sensing electrodes and the second sensing electrodes and does not cover the first sensing electrodes and the second sensing electrodes to form a mesh-like pattern, the color compensation layer is made from an organic material and covers the first wires, the thickness of the color compensation layer is larger than the thickness of the first sensing electrodes and the thickness of the second sensing electrodes, the second wires are provided on a surface of the color compensation layer and are electrically insulated from the first wires.

2. The capacitive touch panel according to claim 1, wherein the mesh-like pattern comprises a plurality of sub-patterns that are discontinuous.

3. The capacitive touch panel according to claim 1, wherein the transparent substrate is a transparent plastic substrate, a glass substrate, or a color filter.

4. The capacitive touch panel according to claim 1, further comprising:
a protection layer covering the first sensing electrodes, the second sensing electrode sets, and the color compensation layer.

5. The capacitive touch panel according to claim 4, wherein the protection layer is made from an inorganic material.

6. The capacitive touch panel according to claim 1, wherein the first sensing electrodes and the second sensing electrodes are made from a carbon nano tube, a conducting polymer, a silver filament, indium tin oxide (ITO), indium zinc oxide (IZO), zinc oxide (ZnO), or tin oxide (SnO).

7. The capacitive touch panel according to claim 1, wherein the second wires are made from a carbon nano tube, a conducting polymer, a silver filament, indium tin oxide (ITO), indium zinc oxide (IZO), zinc oxide (ZnO), tin oxide (SnO), or a metallic material.

8. The capacitive touch panel according to claim 1, wherein the first direction and the second direction are substantially orthogonal.

9. The capacitive touch panel according to claim 1, wherein the capacitive touch panel is disposed on a display and the transparent substrate serves as a cover lens.

10. The capacitive touch panel according to claim 9, wherein the display is a liquid crystal display, an organic light emitting diode display, an electro-phoretic display, or an electro-wetting display.

* * * * *